(12) United States Patent
Horn et al.

(10) Patent No.: US 12,332,897 B1
(45) Date of Patent: Jun. 17, 2025

(54) SELECTIVE SKIPPING OF DICTIONARY SCANS AND/OR INDEX LOOKUPS DURING QUERY PROCESSING IN DATABASE SYSTEMS

(71) Applicant: SAP SE, Walldorf (DE)

(72) Inventors: Oliver Horn, Nussloch (DE); Cheng-Lun Li, Nussloch (DE); Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/813,148

(22) Filed: Aug. 23, 2024

(51) Int. Cl.
*G06F 7/00* (2006.01)
*G06F 16/2453* (2019.01)

(52) U.S. Cl.
CPC .. *G06F 16/24549* (2019.01); *G06F 16/24542* (2019.01)

(58) Field of Classification Search
CPC ......... G06F 16/24549; G06F 16/24542; G06F 16/2455; G06F 16/24557; G06F 16/22; G06F 16/245; G06F 16/13; G06F 16/24569
USPC .......... 707/718, 765, 769, 999.003, 999.002, 707/17.014, 17.017; 706/12, 45, 46, 47, 706/52; 715/234, 239, 733
See application file for complete search history.

(56) References Cited

U.S. PATENT DOCUMENTS

| | | |
|---|---|---|
| 11,176,133 B2 | 11/2021 | Horn et al. |
| 2018/0150514 A1* | 5/2018 | Willems ............ G06F 16/24539 |
| 2020/0320048 A1* | 10/2020 | Horn ................... G06F 16/2291 |
| 2020/0320074 A1* | 10/2020 | Horn ................. G06F 16/24542 |
| 2022/0382751 A1* | 12/2022 | Dhuse ................. G06F 16/2228 |
| 2023/0091018 A1* | 3/2023 | Arnold .............. G06F 16/24553 707/765 |
| 2023/0107652 A1* | 4/2023 | Veselova ........... G06F 16/24542 |
| 2023/0376473 A1 | 11/2023 | Armler et al. |
| 2024/0111745 A1* | 4/2024 | Wendel, III ....... G06F 16/24558 |

* cited by examiner

*Primary Examiner* — Md I Uddin
(74) *Attorney, Agent, or Firm* — Fish & Richardson P.C.

(57) ABSTRACT

Methods, systems, and computer-readable storage media for a set of pipelines that enable selective skipping of dictionary scans and/or index lookups when processing queries in database management systems, such that dictionary scans and/or index lookups are only executed when needed, eliminating unnecessary execution of dictionary scans and/or index lookups to improve efficiency of the database system in terms of reducing load on technical resources and improve query performance by reducing latency in returning query results.

14 Claims, 8 Drawing Sheets

SELECTIVE SKIPPING OF DICTIONARY SCANS AND/OR INDEX LOOKUPS DURING QUERY PROCESSING IN DATABASE SYSTEMS

BACKGROUND

Database systems store data that can be queried. For example, a query can be submitted to a database system, which processes the query and provides a query result. Queries are written in a query language. An example query language includes, without limitation, the structured query language (SQL), which can be described as a standard database language that is used to create, maintain and retrieve data stored in a relational database (e.g., a database, in which data is stored in relational tables). Processing of the query includes creating a query execution plan (QEP) that is executed by an execution engine to provide a query result.

SUMMARY

Implementations of the present disclosure are directed to processing queries in database management systems. More particularly, implementations of the present disclosure are directed to a set of pipelines that enable selective skipping of dictionary scans and/or index lookups during processing of queries in database management systems.

In some implementations, actions include receiving a first query including a first set of predicates, the first set of predicates including a first predicate and a second predicate for querying values of a table, processing the first predicate and the second predicate through a set of pipelines including an initialization pipeline and an index lookup pipeline that are executed sequentially, the processing including determining, during execution of the initialization pipeline, that a first set of value identifiers for the first predicate is non-empty and that a second set of value identifiers for the second predicate is empty, performing, during execution of the index lookup pipeline, an index lookup for the first set of value identifiers to provide a first set of row positions of the table, and inhibiting, during execution of the index lookup pipeline and in response to determining that the second set of value identifiers is empty, the index lookup for the second set of value identifiers, determining a first set of rows based on the first set of row positions, and returning a query result in response to the query, the query result including one or more data values provided in one or more rows of the first set of rows. Other implementations of this aspect include corresponding systems, apparatus, and computer programs, configured to perform the actions of the methods, encoded on computer storage devices.

These and other implementations can each optionally include one or more of the following features: a conjunction operator of the initialization pipeline instructs a conjunction operator of the index lookup pipeline to inhibit execution of the index lookup for the second set of value identifiers; a conjunction operator of the index lookup pipeline adds an empty leaf node to a tree structure of the index lookup pipeline in response to determining that the second set of value identifiers is empty; determining a first set of rows based on the first set of row positions includes executing an evaluation pipeline comprising two or more data vector scans, at least one data vector scan returning the first set of rows; determining a first set of rows based on the first set of row positions further includes executing an estimation pipeline to estimate numbers of results returned for the table, an order of execution of the two or more data vector scans being determined based on the numbers of results; the pipelines in the set of pipelines have a same tree structure; and actions further include receiving a second query including a second set of predicates, the second set of predicates including a third predicate and a fourth predicate for querying values of the table, processing the third predicate and the fourth predicate through the set of pipelines, the processing including determining, during execution of the initialization pipeline, that a third set of value identifiers for the third predicate is empty, and in response, inhibiting, during execution of the initialization pipeline, a dictionary scan for the fourth predicate, and inhibiting, during execution of the index lookup pipeline, the index lookup for each of the third predicate and the fourth predicate.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
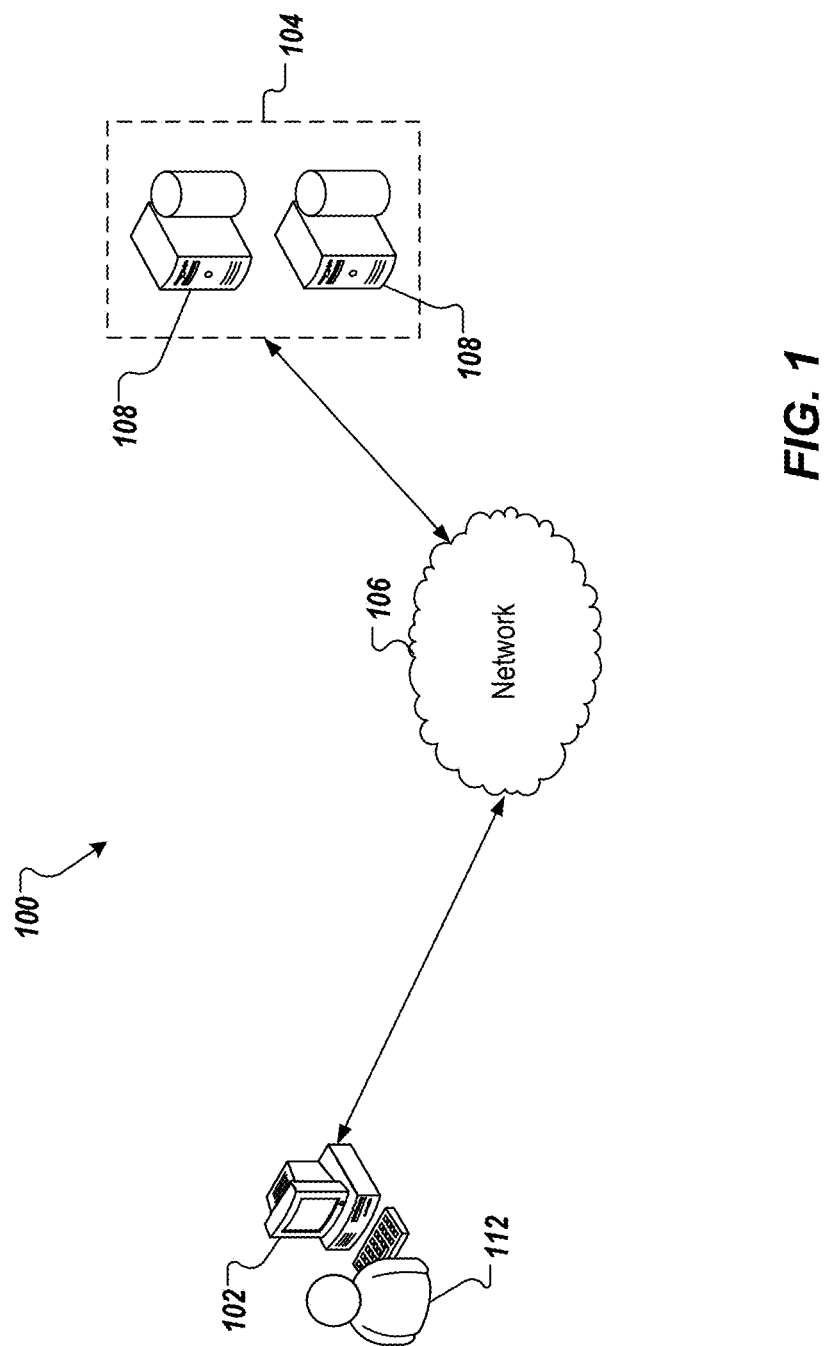
FIG. 1 depicts an example architecture that can be used to execute implementations of the present disclosure.

Implementations of the present disclosure are directed to processing queries in database management systems. More particularly, implementations of the present disclosure are directed to a set of pipelines that enable selective skipping of dictionary scans and/or index lookups during processing of queries in database management systems.

Implementations can include actions of a query including a set of predicates, the set of predicates including a first predicate and a second predicate for querying values of a table, processing the first predicate and the second predicate through a set of pipelines including an initialization pipeline and an index lookup pipeline that are executed sequentially, the processing including determining, during execution of the initialization pipeline, that a first set of value identifiers for the first predicate is non-empty and that a second set of value identifiers for the second predicate is empty, performing, during execution of the index lookup pipeline, an index lookup for the first set of value identifiers to provide a first set of row positions of the table, and inhibiting, during execution of the index lookup pipeline and in response to determining that the second set of value identifiers is empty, the index lookup for the second set of value identifiers, determining a first set of rows based on the first set of row positions, and returning a query result in response to the query, the query result including one or more data values provided in one or more rows of the first set of rows.

To provide further context for implementations of the present disclosure, and as introduced above, database systems store data that can be queried. Data is stored in rows and columns of tables. Data storage can include column-oriented storage or row-oriented storage. Implementations of the present disclosure are described in further detail herein with reference to column-oriented storage. However, it is appreciated that implementations of the present disclosure can be realized using row-oriented storage.

A query can be submitted to a database system, which processes the query and provides a query result. Queries are written in a query language. An example query language includes, without limitation, the structured query language (SQL), which can be described as a standard database language that is used to create, maintain and retrieve data stored in a relational database (e.g., a database, in which data is stored in relational tables). Processing of the query includes creating a query execution plan (QEP) that is executed by an execution engine to provide a query result.

Database management systems include multiple structures for enhancing performance of query processing. Example structures include, for each table, a dictionary and a data vector. The dictionary contains a list of distinct values across columns of the table and each distinct value is associated with a value identifier (valueID) that is used as an index for the respective distinct value. The data vector has the number of records in the column, and, for each entry, there is a valueID that belongs to a row. That is, the index to the data vector is row and the entry is the valueID referring to a value in the dictionary. Another structure can include an index (also referred to as an inverted index) that includes, for each value indexed with valueID, an entry as a list of rows that contain the value.

Queries submitted to database systems can include one or more filters, also referred to as predicates, to filter records of tables that are to be returned in query results. For example, a SQL query can include one or more WHERE clauses that filter rows of tables returned by SELECT, UPDATE, and/or DELETE statements based on defined conditions. For example, each WHERE clause specifies a condition that each row must meet to be returned in response to or be affected by a query. By way of non-limiting example, the following example query statement can be considered:

SELECT*FROM T WHERE A>1 AND B<=2

In processing a query that includes the above-example query statement, the database system evaluates predicates A>1 on column A and B<=2 on column B in table T (which can be split across multiple fragments/partitions, as discussed in further detail herein). In this example, each record in the table T having a value greater than 1 in the column A and a value less than or equal to 2 in the column B will be selected in response to the query.

In processing queries, pipelines in a set of pipelines are executed in a sequential order, each pipeline including a set of operations that are executed. In traditional query processing, the set of pipelines includes an initialization pipeline, an estimation pipeline, and an evaluation pipeline. In traditional query processing, the initialization pipeline includes index lookup operators (IndexLookupOp) and dictionary scan operators (DictScanOp). In some examples, an index lookup operator reads data of a table that is stored within an index of the table and can return a result set. If the data being sought (e.g., values in column A that are >1) is in the index, the result set can include values meeting the predicate. However, it can occur that the result set is empty (e.g., no values in the index meet the criteria). In some examples, a dictionary scan operator scans a dictionary (e.g., of a table, of a column of a table) to determine valueIDs for values that match a predicate (e.g., values in column A that are >1) and return a result set that includes the valueIDs. However, it can occur that the result set is empty (e.g., no values in the index meet the criteria).

In traditional query processing, the initialization pipeline is absent conjunction operators and an index lookup operator can come after a dictionary scan operator. This results in processing inefficiencies, because dictionary scan and index lookup will always run, even if the result set(s) from a previous dictionary scan and/or index lookup is empty. That is, dictionary scans and/or index lookups are unnecessarily executed, which wastes technical resources of the database system, such as processing and memory. This also lengthens execution of queries, which results in reduced query performance in terms of increased latency to return a query result.

In view of the above context, implementations of the present disclosure provide a set of pipelines that enable selective skipping of dictionary scans and/or index lookups when processing queries in database management systems. In this manner, dictionary scans and/or index lookups are only executed when needed, eliminating unnecessary execution of dictionary scans and/or index lookups. This improves efficiency of the database system in terms of reducing load on technical resources (e.g., processing, memory) and improves query performance by reducing latency in returning query results.

In accordance with implementations of the present disclosure, the set of pipelines includes an initialization pipeline, an index lookup pipeline, an estimation pipeline, and an evaluation pipeline. As described in further detail herein, the index lookup pipeline is added and the initialization pipeline of present disclosure is modified relative to the set of pipelines of traditional query processing introduced above. More particularly, the initialization pipeline of the present disclosure is absent index lookup operations and, instead, index lookup operations are executed in the index lookup pipeline. The index lookup pipeline of the present disclosure is executed after the initialization pipeline. Further, and as described in further detail herein, conjunction operators are included in both the initialization pipeline and the index lookup pipeline. To provide performance improvements over traditional query processing, the conjunction operators of the initialization pipeline and the index lookup pipeline enable dictionary scans and/or index lookups to be skipped (not executed), if determined to be unnecessary (e.g., an empty result is returned from a previous dictionary scan or index lookup).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a database management system that receives queries (e.g., from the client device 102) and processes the queries to return respective query results (e.g., to the client device 102). More particularly, and as described in further detail herein, the database management system includes a query processor that processes queries using a set of pipelines that enable selective skipping of dictionary scans and/or index lookups.

Figure 2:
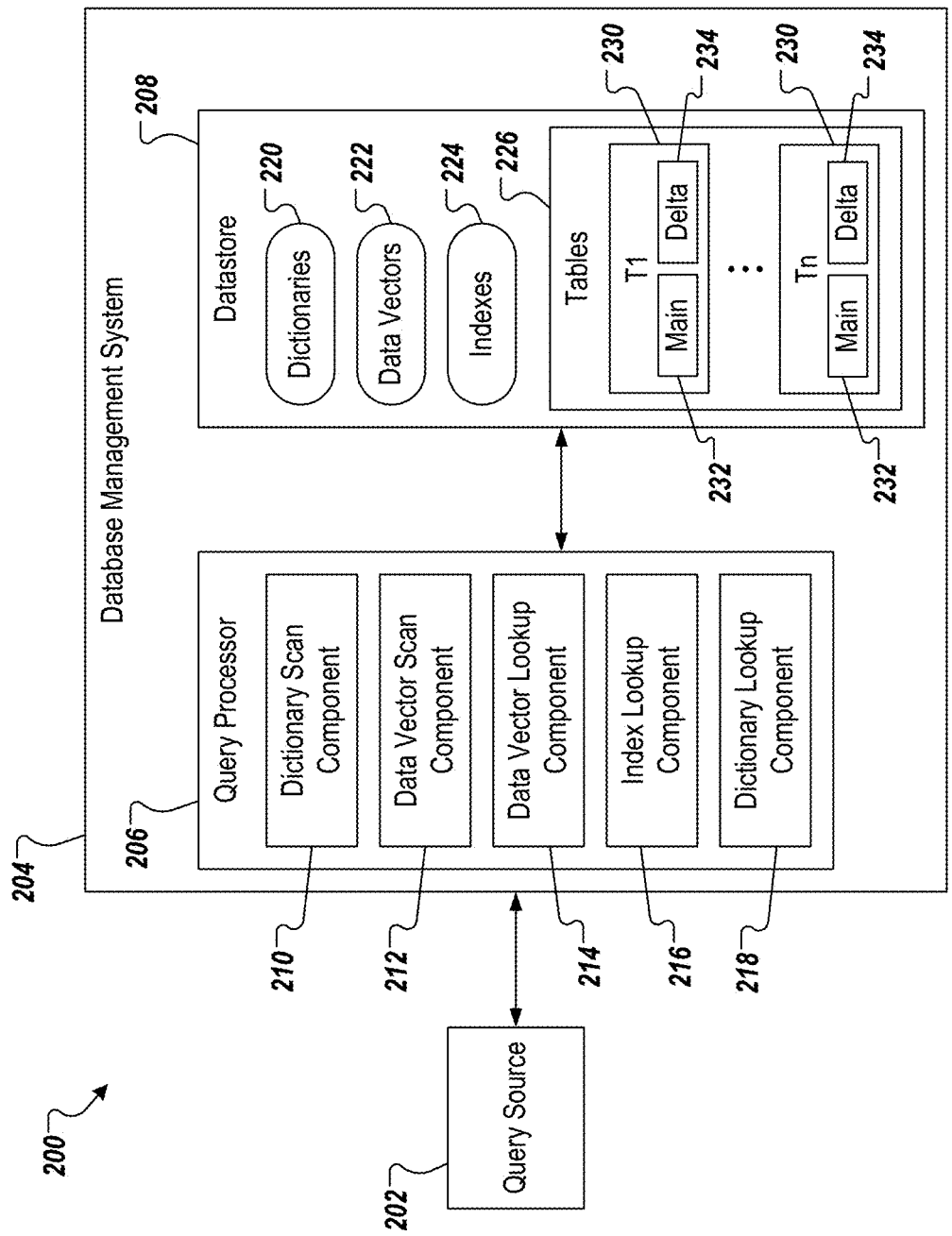
FIG. 2 depicts an example conceptual architecture of a database management system in accordance with implementations of the present disclosure.

FIG. 2 depicts an example conceptual architecture 200 in accordance with implementations of the present disclosure. In the depicted example, the conceptual architecture 200 includes a query source 202 and a database management system 204. In some examples, the query source 202 (e.g., a client device, an application server) submits queries to the database management system 204, which processes the queries to return query results.

In the example of FIG. 2, the database management system 204 includes a query processor 206 and a datastore 208. The query processor 206 includes a dictionary scan component 210, a data vector scan component 212, a data vector lookup component 214, an index lookup component 216, and a dictionary lookup component 218. In some examples, database management system 204 (and/or the query processor 206) can include other components, such as, but not limited to, a query optimizer and a query execution engine.

In some examples, the query processor 206 can be configured to analyze a query plan that is generated for a query and evaluate predicates (filters) to return a result set. As described in further detail herein, the query processor 206 can execute a set of pipelines of the present disclosure to evaluate the predicates and selectively skip execution of one or more index lookups and/or one or more dictionary scans.

In the example of FIG. 2, the datastore 208 includes a set of dictionaries 220, a set of data vectors 222, a set of indexes 224, and a set of tables 226. In some examples, the set of tables 226 can include tables 230 (e.g., T1, . . . , Tn). In some examples, each table 230 includes a main fragment 232 and a delta fragment 234. Accordingly, one or more of the tables 230 can be separated into multiple containers (or partitions) that include the main fragment 232 and the delta fragment 234. In general, the main fragment 232 includes data that is not subject to change and/or data that has not been changed recently. As such, the main fragment 232 can be optimized for read access (e.g., using dictionary compression with sorted dictionaries). Any updates to a table 230 can be implemented as changes to the delta fragment 234. These can include INSERT, UPDATE, and/or DELETE statements. Dictionary compression may also be applicable to the delta fragment 234. Contents of the main fragment 232 and the delta fragment 234 can be combined using a merge operation, which can be performed (e.g., automatically, manually, etc. by the database system) to ensure, for example, that the delta fragment 234 does not contain more than a predetermined amount of table data (e.g., no more than 10%).

FIGS. 3A-3D depict example pipelines for query processing in accordance with implementations of the present disclosure. In accordance with implementations of the present disclosure, a set of pipelines for query processing includes an initialization pipeline (discussed with reference to FIG. 3A), an index lookup pipeline (discussed with reference to FIG. 3B), an estimation pipeline (discussed with reference to FIG. 3C), and an evaluation pipeline (discussed with reference to FIG. 3D). The examples of FIGS. 3A-3D are based on a query that implicates two predicates. For example, and with non-limiting reference to the example query statement introduced above, a first predicate can include A>1 on column A and a second predicate can include B<=2 on column B in table T.

In the examples of FIGS. 3A-3D, each pipeline is represented as a tree with a root node, intermediate nodes, and leaf nodes. In some examples, each branch off a root node represents a fragment of a table and, as such, operators that act on a respective fragment. For example, and as discussed herein, a table can include a main fragment and a delta fragment. A first branch of a pipeline can operate on the main fragment (e.g., to identify rows meeting predicates) and a second branch of the pipeline can operate on the delta fragment (e.g., to identify rows meeting predicates). In some examples, each leaf node represents a respective predicate, or result from a previous pipeline.

In accordance with implementations of the present disclosure, the tree structures of the pipelines are identical. That is, each pipeline includes the same number and arrangement of nodes, from root node to leaf nodes. Because the tree structures of the pipelines are identical, a mapping between pipelines is provided. In this manner, operations of a pipeline can be skipped when it is already known that the operations are unnecessary from a previous pipeline. Further, identical tree structures improve efficiencies in maintaining the code that the pipelines are embodied in.

Figure 3A:
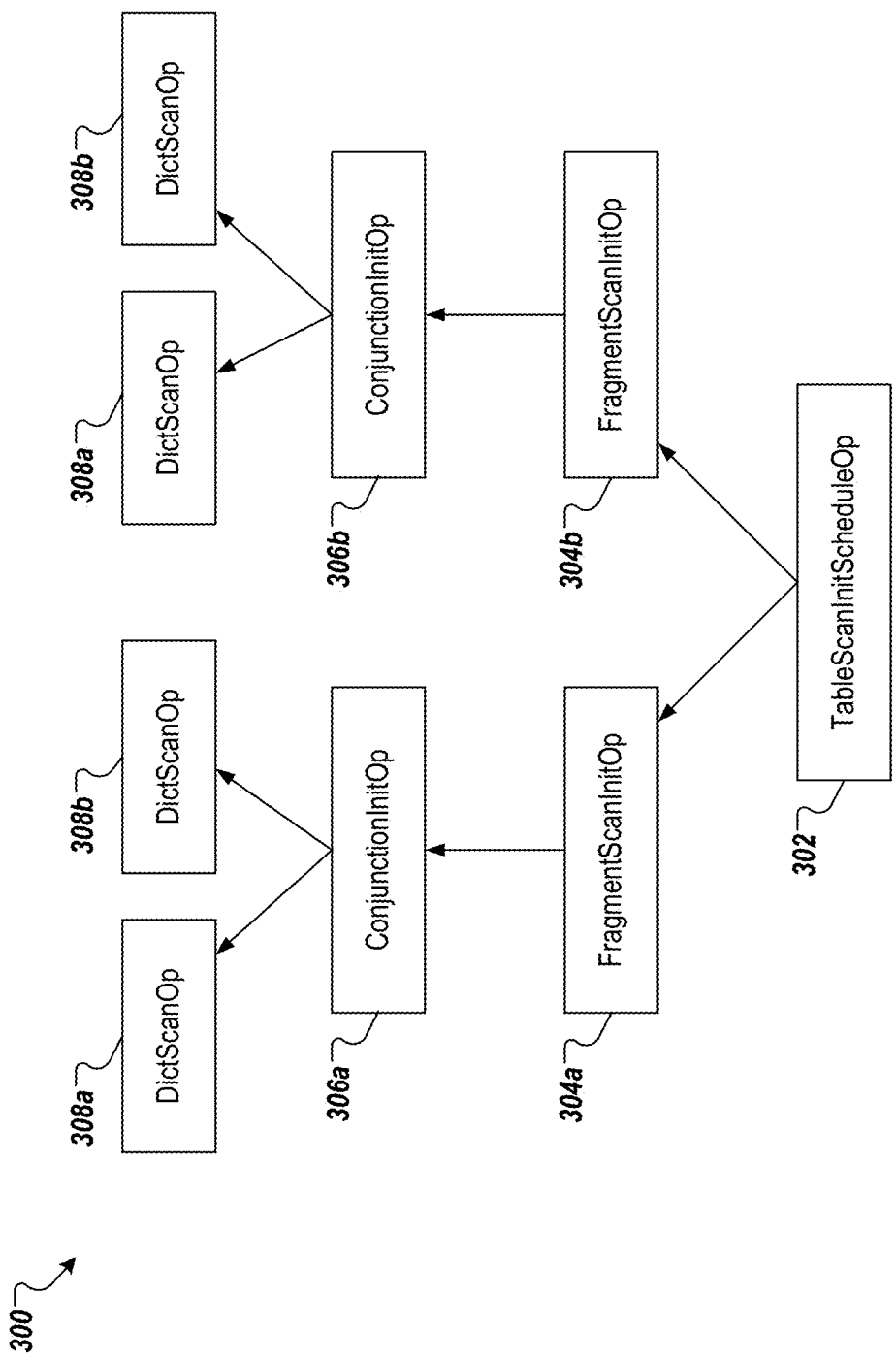
FIGS. 3A-3D depict example pipelines for query processing in accordance with implementations of the present disclosure.

FIG. 3A is a conceptual depiction of at least a portion of an initialization pipeline 300 in accordance with implementations of the present disclosure. In the example of FIG. 3A, the initialization pipeline 300 includes a table scan operator 302, fragment scan operators 304a, 304b, conjunction operators 306a, 306b, and dictionary scan operators 308a, 308b. In some examples, the table scan operator 302 calls for dictionary scans on each fragment of a table (e.g., main fragment, delta fragment). The fragment scan operators 304a, 304b call the conjunction operators 306a, 306b, respectively, for dictionary scans of the respective predicates. The conjunction operators 306a, 306b call the dictionary scan operators 308a, 308b, for respective predicates.

For example, and with non-limiting reference to the example first predicate (A>1 on column A) and second predicate (B<=2 on column B), the conjunction operator 306a calls the dictionary scan operator 308a for the first predicate and the dictionary scan operator 308b for the second predicate to evaluate a first fragment (e.g., main fragment) of the table T. The conjunction operator 306b calls the dictionary scan operator 308a for the first predicate and the dictionary scan operator 308b for the second predicate to evaluate a second fragment (e.g., delta fragment) of the table T.

In some examples, each dictionary scan returns a set of valueIDs that can be empty or non-empty. For example, a set of valueIDs that is non-empty includes one or more valueIDs, each valueID identifying a value that satisfies a predicate. For example, and with reference to the example first predicate, each valueID in a set of valueIDs indicate values of column A that are greater than 1. A set of valueIDs that is empty indicates that no values satisfy the predicate. For example, and with reference to the example second predicate, a set of valueIDs that is empty indicates that no values in column B that are less than or equal to 2.

In accordance with implementations of the present disclosure, dictionary scans can be selectively skipped. For example, if a dictionary scan for one predicate returns a set of valueIDs that is empty, then a dictionary scan for another predicate can be skipped. In some examples, if a dictionary scan returns an empty set, any subsequent dictionary scan automatically skipped and/or skipping can depend on the particular query statement. For example, if the query statement includes predicate A AND predicate B, and the dictionary scan for predicate A returns empty, then the dictionary scan for predicate B is skipped (and index lookups for both are skipped in index lookup pipeline). As another example, if the query statement includes predicate A OR predicate B, and the dictionary scan for predicate A returns empty, the dictionary scan for predicate B is still executed (and index lookup for predicate A is skipped in the index lookup pipeline, but index lookup for predicate B is performed (assuming dictionary scan for predicate B is not empty)).

In some implementations, if the dictionary scan for a predicate returns a set of valueIDs that is empty, the conjunction operator 308a, 308b provides a message to a respective conjunction operator of the index lookup pipeline, as described in further detail herein. In this manner, the conjunction operator can skip an index lookup for the predicate. Each set of valueIDs that is not empty is returned as output of the initialization pipeline. For example, the dictionary scan operators 308a, 308b return sets of valueIDs for the respective table fragments and the table scan operator 302 returns all sets of valueIDs for the table.

Figure 3B:
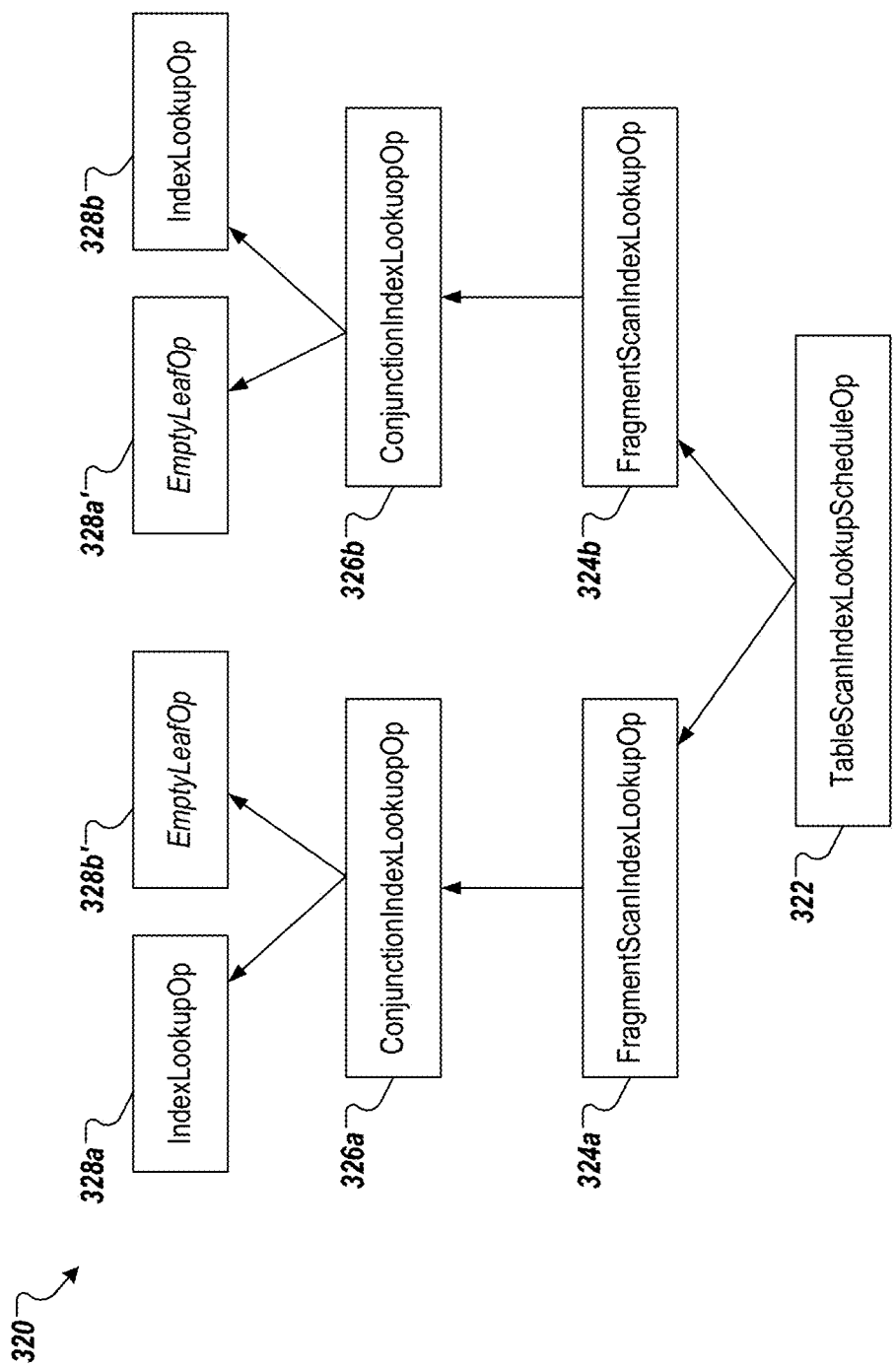

FIG. 3B is a conceptual depiction of at least a portion of an index lookup pipeline 320 in accordance with implementations of the present disclosure. In the example of FIG. 3B, the index lookup pipeline 320 includes a table scan index lookup operator 322, fragment scan index lookup operators 324a, 324b, conjunction index lookup operators 326a, 326b, index lookup operators 328a, 328b, and empty leaf operators 328', 328b'.

The example of FIG. 3B represents a scenario, in which index lookups are skipped as a result of respective dictionary scans returning sets of valueIDs that are empty. Here, dummy leaf nodes, namely the empty leaf operators 328a', 328b' correspond to dictionary scans that were skipped in the initialization pipeline 300. In some examples, in response to the conjunction operator 308a, 308b, the conjunction index lookup operators 326a, 326b insert the dummy leaf nodes 328a', 328b', respectively. The dummy leaf nodes 328a', 328b' enable the tree structure to be maintained as identical to the tree structures of each of the other pipelines, as described herein.

In some implementations, the conjunction index lookup operators 326a, 326b call the index lookup operators 328a, 328b, using the set of valueIDs for respective predicates. More particularly, for each set of valueIDs that is returned from the initialization pipeline 300, an index lookup is executed to determine a set of row positions, each row position indicating a row of the table that records the value corresponding to the valueID. For example, the index lookup operators 328a, 328b return sets of row positions for the respective table fragments and the table index lookup operator 322 returns all sets of row positions for the table.

Figure 3C:
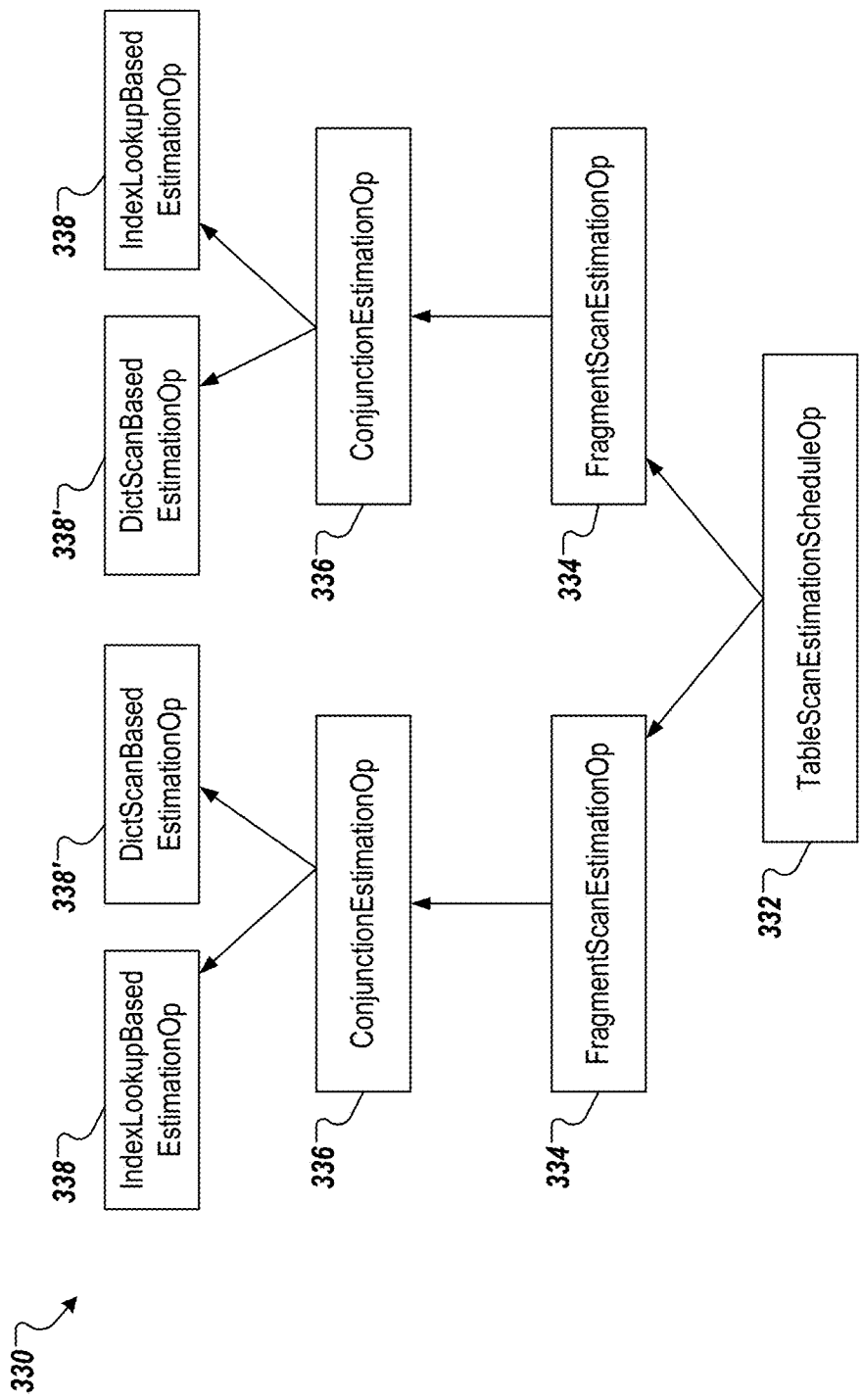
Figure 3D:
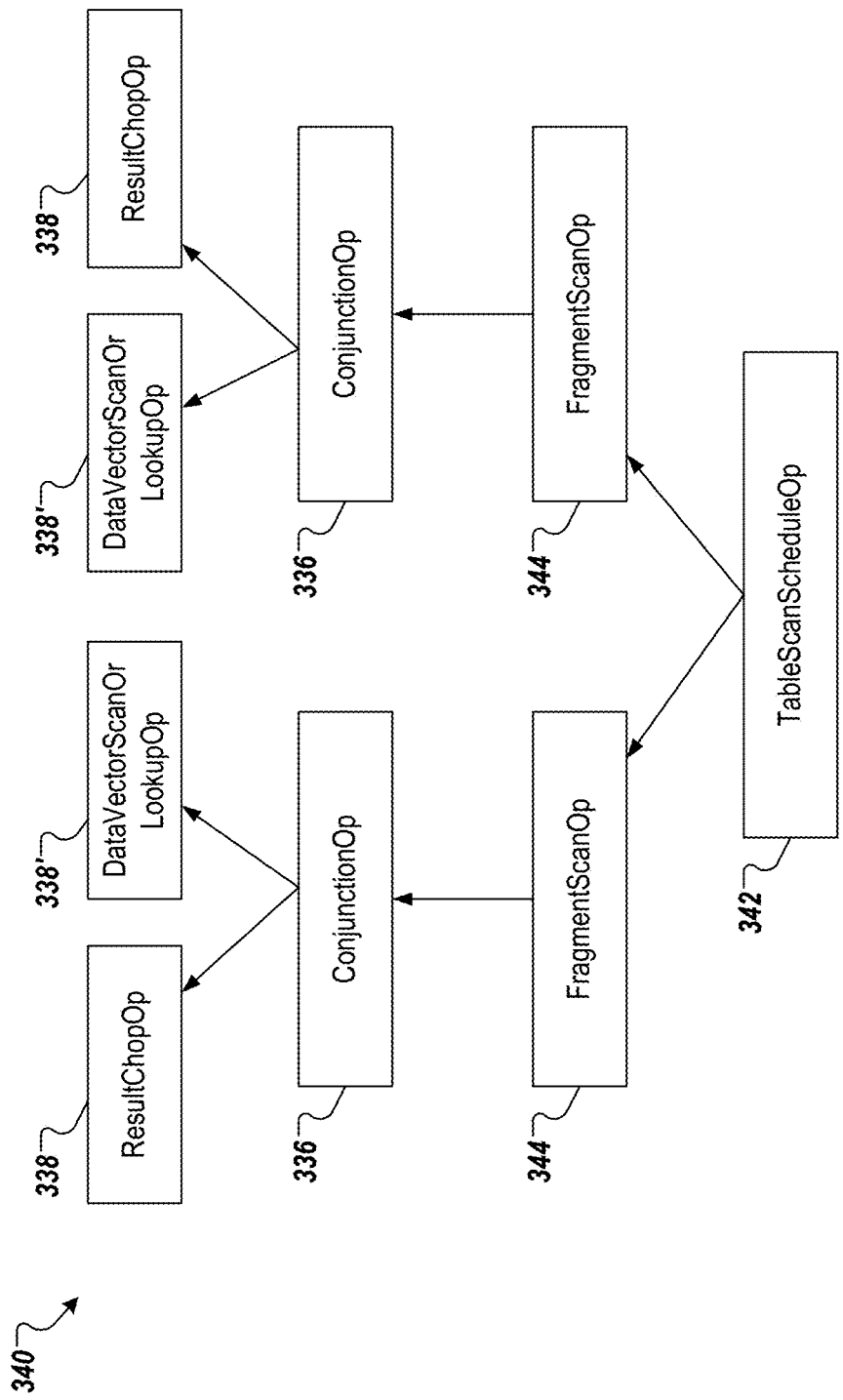

FIGS. 3C and 3D depict an estimation pipeline 330 and an evaluation pipeline 340, respectively, which execute unchanged with respect to traditional query processing. Consequently, each of the estimation pipeline 330 and the evaluation pipeline 340 are described herein in general terms.

FIG. 3C is a conceptual depiction of at least a portion of the estimation pipeline 330 in accordance with implementations of the present disclosure. In the example of FIG. 3C, the estimation pipeline 330 includes a table scan estimation operator 332, fragment scan estimation operators 324a, 324b, conjunction estimation operators 326a, 326b, index lookup-based estimation operators 328a, 328b, and dictionary scan-based estimation operators 328a', 328b'.

In general, the estimation pipeline 330 executes to estimate numbers of results that will be returned from data vector scans in execution of the evaluation pipeline 340. For example, the results of the index lookups of the index lookup gives an exact number of rows (in each set of row positions) for each predicate. Further, the results of the dictionary scans can be used to estimate a number of rows for each predicate (e.g., the column-store can be queried for each valueID to return an estimated number of rows that include the valueID). In some examples, the estimate pipeline 330 provides a results set estimate for each predicate, which can be used in the evaluation pipeline 340 to reorder data vector scans. For example, execution of dictionary scans to return table entries can be ordered based on the results set estimates (e.g., predicates expected to return fewer results can be executed first to conserve time and technical resources).

FIG. 3D is a conceptual depiction of at least a portion of an evaluation pipeline 340 in accordance with implementations of the present disclosure. In the example of FIG. 3D, the evaluation pipeline 340 includes a table scan operator 342, fragment scan operators 344a, 344b, conjunction operators 346a, 346b, result chop operators 338a, 338b, and data vector scan or lookup operators 338a', 338b'. In general, the evaluation pipeline 340 executes to return a set of rows including entries of the table that meet the predicates, each entry corresponding to a row of the table. For example, and with non-limiting reference to the example query statement introduced above, the evaluation pipeline 340 executes to return all rows of the table T where values of column A are greater than 1 and values of column B are less than or equal to 2.

In some examples, the set of rows, or at least a portion thereof, are returned in a query result that is responsive to the query. In some examples, one or more query statements can be executed on one or more rows in the set of rows. For example, a row can be updated, deleted, and the like, the query result indicating execution of the one or more query statements on the row(s).

Figure 4:
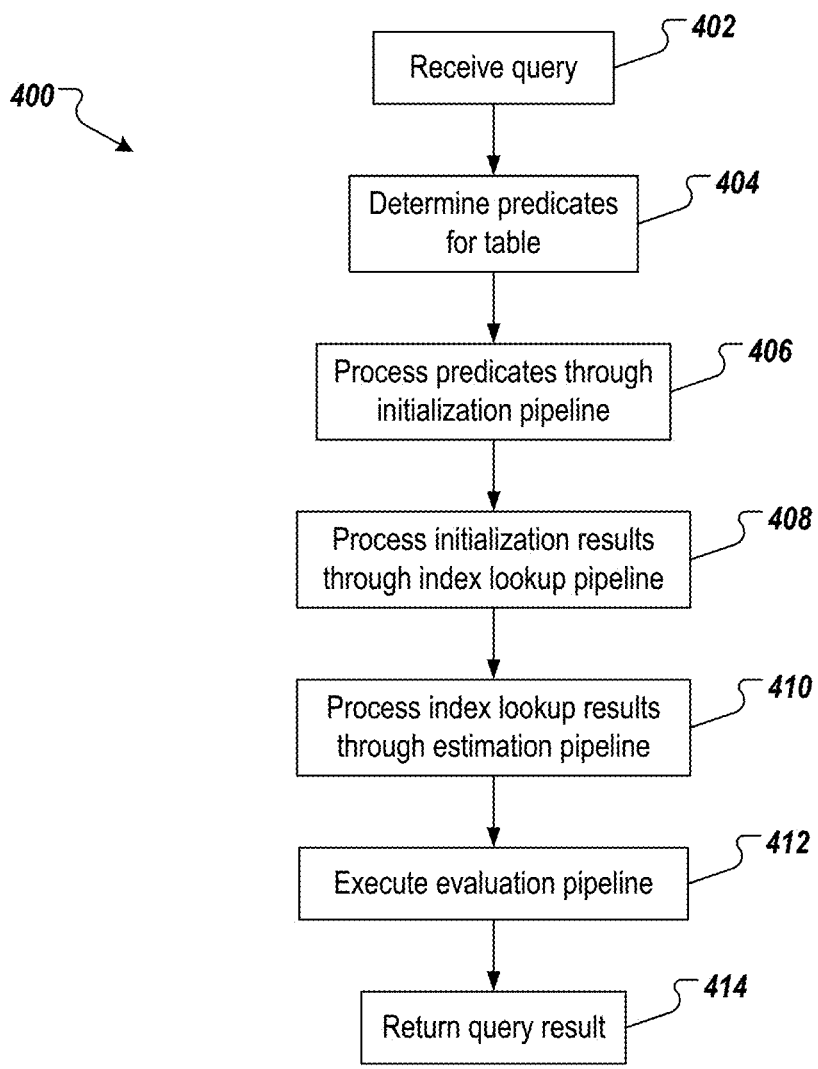
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A query is received (402) and predicates for a table are determined (404). For example, and as described herein, the query source 202 can submit a query to the database management system 204 and the query processor can determine predicates for a table that data that is responsive to the query is to be returned from. The predicates are processed through an initialization pipeline (406). For example, and as described herein, the predicates can be processed through the initialization pipeline 300 of FIG. 3A. In some examples, a first set of value identifiers for a first predicate and a second set of value identifiers for a second predicate are returned for the initialization pipeline. In some examples, the first set of value identifiers is non-empty and the second set of value identifiers is empty.

Initialization results are processed through an index lookup pipeline (408). For example, and as described herein, initialization results from the initialization pipeline 300 are processed through the index lookup pipeline 320 of FIG. 3B. In some examples, an index lookup for the first set of value identifiers is performed to provide a first set of row positions of the table. Further, during execution of the index lookup pipeline and in response to determining that the second set of value identifiers is empty, the index lookup for the second set of value identifiers is inhibited (skipped). Index lookup results are processed through an estimation pipeline (410) and an evaluation pipeline is executed (412). For example, and as described herein, the estimate pipeline 330 of FIG. 3C provides a results set estimate for each predicate, which can be used in the evaluation pipeline 340 of FIG. 3D to reorder data vector scans. In some examples, the evaluation pipeline 340 executes to return a set of rows including entries of the table that meet the predicates, each entry corresponding to a row of the table. Query results are returned (414). For example, and as described herein, the set of rows, or at least a portion thereof, are returned in a query result that is responsive to the query.

Figure 5:
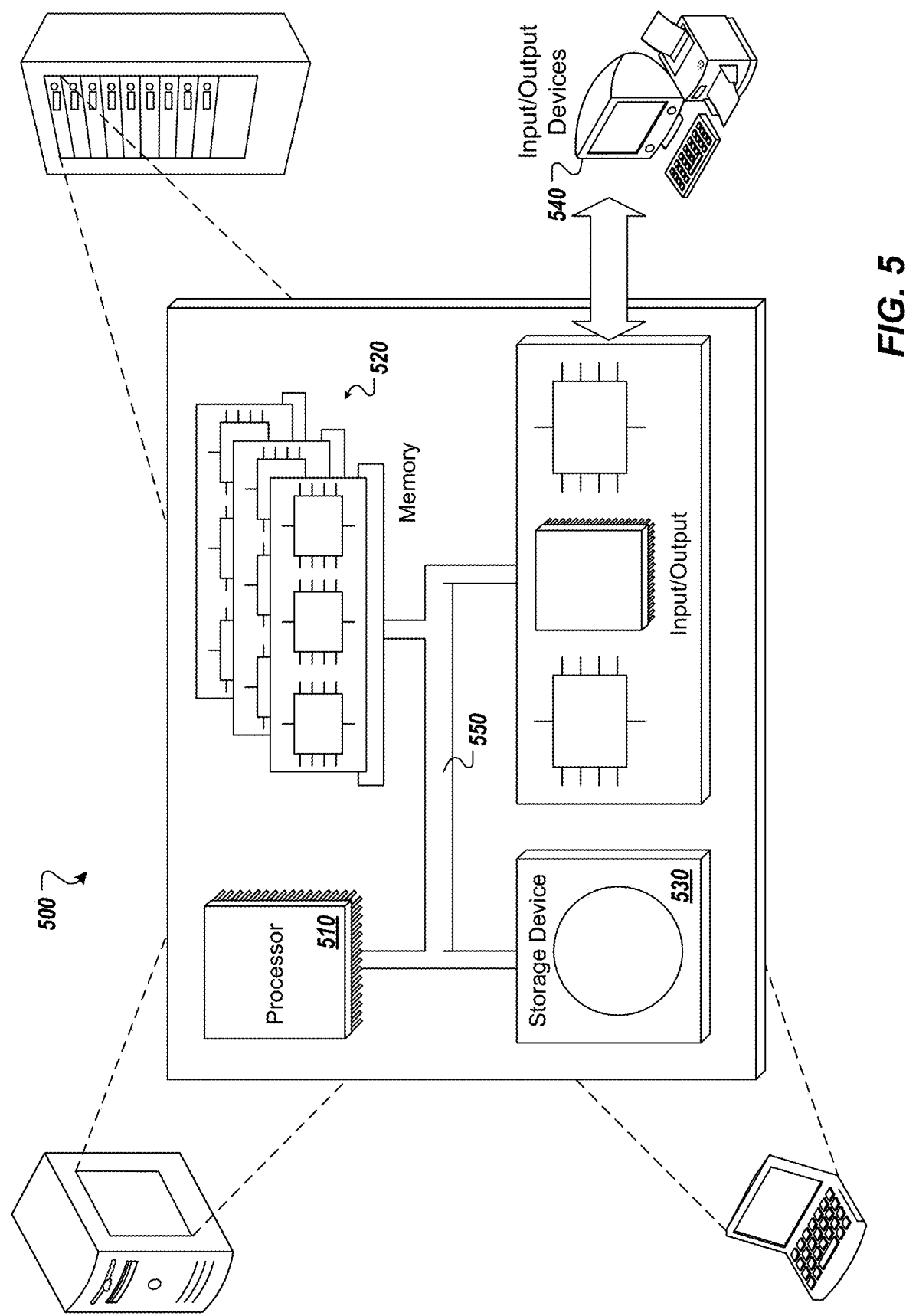
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for processing queries in database management systems, the method being executed by one or more processors and comprising:
receiving a first query comprising a first set of predicates, the first set of predicates comprising a first predicate and a second predicate for querying values of a table;
processing the first predicate and the second predicate through a set of pipelines comprising an initialization pipeline and an index lookup pipeline that are executed sequentially, the processing comprising:
determining, during execution of the initialization pipeline, that a first set of value identifiers for the first predicate is non-empty and that a second set of value identifiers for the second predicate is empty,
performing, during execution of the index lookup pipeline, an index lookup for the first set of value identifiers to provide a first set of row positions of the table, and
inhibiting, during execution of the index lookup pipeline and in response to determining that the second set of value identifiers is empty, the index lookup for the second set of value identifiers;
determining a first set of rows based on the first set of row positions, wherein determining a first set of rows based on the first set of row positions comprises: executing an evaluation pipeline comprising two or more data vector scans, at least one data vector scan returning the first set of rows, and executing an estimation pipeline to estimate numbers of results returned for the table, an order of execution of the two or more data vector scans being determined based on the numbers of results; and
returning a query result in response to the first query, the query result comprising one or more data values provided in one or more rows of the first set of rows.

2. The method of claim 1, wherein a conjunction operator of the initialization pipeline instructs a conjunction operator of the index lookup pipeline to inhibit execution of the index lookup for the second set of value identifiers.

3. The method of claim 1, wherein a conjunction operator of the index lookup pipeline adds an empty leaf node to a tree structure of the index lookup pipeline in response to determining that the second set of value identifiers is empty.

4. The method of claim 1, wherein the pipelines in the set of pipelines have a same tree structure.

5. The method of claim 1, further comprising:
receiving a second query comprising a second set of predicates, the second set of predicates comprising a third predicate and a fourth predicate for querying values of the table;
processing the third predicate and the fourth predicate through the set of pipelines, the processing comprising:
determining, during execution of the initialization pipeline, that a third set of value identifiers for the third predicate is empty, and in response:
inhibiting, during execution of the initialization pipeline, a dictionary scan for the fourth predicate, and
inhibiting, during execution of the index lookup pipeline, the index lookup for each of the third predicate and the fourth predicate.

6. A non-transitory computer-readable storage medium coupled to one or more processors and having instructions stored thereon which, when executed by the one or more processors, cause the one or more processors to perform operations for processing queries in database management systems, the operations comprising:
receiving a first query comprising a first set of predicates, the first set of predicates comprising a first predicate and a second predicate for querying values of a table;
processing the first predicate and the second predicate through a set of pipelines comprising an initialization pipeline and an index lookup pipeline that are executed sequentially, the processing comprising:
determining, during execution of the initialization pipeline, that a first set of value identifiers for the first predicate is non-empty and that a second set of value identifiers for the second predicate is empty,
performing, during execution of the index lookup pipeline, an index lookup for the first set of value identifiers to provide a first set of row positions of the table, and
inhibiting, during execution of the index lookup pipeline and in response to determining that the second set of value identifiers is empty, the index lookup for the second set of value identifiers;
determining a first set of rows based on the first set of row positions, wherein determining a first set of rows based on the first set of row positions comprises: executing an evaluation pipeline comprising two or more data vector scans, at least one data vector scan returning the first set of rows, and executing an estimation pipeline to estimate numbers of results returned for the table, an order of execution of the two or more data vector scans being determined based on the numbers of results; and
returning a query result in response to the first query, the query result comprising one or more data values provided in one or more rows of the first set of rows.

7. The non-transitory computer-readable storage medium of claim 6, wherein a conjunction operator of the initialization pipeline instructs a conjunction operator of the index lookup pipeline to inhibit execution of the index lookup for the second set of value identifiers.

8. The non-transitory computer-readable storage medium of claim 6, wherein a conjunction operator of the index lookup pipeline adds an empty leaf node to a tree structure of the index lookup pipeline in response to determining that the second set of value identifiers is empty.

9. The non-transitory computer-readable storage medium of claim 6, wherein the pipelines in the set of pipelines have a same tree structure.

10. The non-transitory computer-readable storage medium of claim 6, wherein operations further comprise:
receiving a second query comprising a second set of predicates, the second set of predicates comprising a third predicate and a fourth predicate for querying values of the table;
processing the third predicate and the fourth predicate through the set of pipelines, the processing comprising:
determining, during execution of the initialization pipeline, that a third set of value identifiers for the third predicate is empty, and in response:
inhibiting, during execution of the initialization pipeline, a dictionary scan for the fourth predicate, and
inhibiting, during execution of the index lookup pipeline, the index lookup for each of the third predicate and the fourth predicate.

11. A system, comprising:
a computing device; and
a non-transitory computer-readable storage device coupled to the computing device and having instructions stored thereon which, when executed by the computing device, cause the computing device to perform operations for processing queries in database management systems, the operations comprising:
receiving a first query comprising a first set of predicates, the first set of predicates comprising a first predicate and a second predicate for querying values of a table;
processing the first predicate and the second predicate through a set of pipelines comprising an initialization pipeline and an index lookup pipeline that are executed sequentially, the processing comprising:
determining, during execution of the initialization pipeline, that a first set of value identifiers for the first predicate is non-empty and that a second set of value identifiers for the second predicate is empty,
performing, during execution of the index lookup pipeline, an index lookup for the first set of value identifiers to provide a first set of row positions of the table, and
inhibiting, during execution of the index lookup pipeline and in response to determining that the second set of value identifiers is empty, the index lookup for the second set of value identifiers;
determining a first set of rows based on the first set of row positions, wherein determining a first set of rows based on the first set of row positions comprises: executing an evaluation pipeline comprising two or more data vector scans, at least one data vector scan returning the first set of rows, and executing an estimation pipeline to estimate numbers of results returned for the table, an order of execution of the two or more data vector scans being determined based on the numbers of results; and
returning a query result in response to the first query, the query result comprising one or more data values provided in one or more rows of the first set of rows.

12. The system of claim 11, wherein a conjunction operator of the initialization pipeline instructs a conjunction operator of the index lookup pipeline to inhibit execution of the index lookup for the second set of value identifiers.

13. The system of claim 11, wherein a conjunction operator of the index lookup pipeline adds an empty leaf node to a tree structure of the index lookup pipeline in response to determining that the second set of value identifiers is empty.

14. The system of claim 11, wherein the pipelines in the set of pipelines have a same tree structure.

* * * * *